United States Patent [19]
Dougherty et al.

[11] Patent Number: 5,370,425
[45] Date of Patent: Dec. 6, 1994

[54] TUBE-TO-HOSE COUPLING (SPIN-SERT) AND METHOD OF MAKING SAME

[75] Inventors: Michael L. Dougherty, Sanford; Norman E. Warner, Winter Springs, both of Fla.

[73] Assignee: S&H Fabricating and Engineering, Inc., Sanford, Fla.

[21] Appl. No.: 112,751

[22] Filed: Aug. 25, 1993

[51] Int. Cl.⁵ ............... F16L 13/007; F16L 33/20
[52] U.S. Cl. ....................... 285/39; 285/256; 285/286; 228/113
[58] Field of Search ............ 265/256, 258, 286; 228/2, 113

[56] References Cited

U.S. PATENT DOCUMENTS

| | | | |
|---|---|---|---|
| 863,745 | 8/1907 | Nelson et al. | 285/149 |
| 2,133,313 | 10/1938 | Weatherhead | 285/256 |
| 2,374,226 | 4/1945 | Melsom | 285/256 X |
| 2,453,997 | 11/1948 | MacWilliams | 285/259 |
| 2,485,976 | 10/1949 | Main | 285/256 |
| 2,499,241 | 2/1950 | Courtot | 285/256 |
| 3,471,180 | 10/1969 | Growey et al. | 285/259 X |
| 3,539,207 | 11/1970 | Harris | 285/256 |
| 3,549,180 | 12/1970 | MacWilliams | 285/256 |
| 4,064,614 | 12/1977 | Horvath | 285/256 |
| 4,548,430 | 10/1985 | Haubert et al. | 285/256 |
| 4,906,030 | 3/1990 | Yokomatsu et al. | 285/256 |

Primary Examiner—Dave W. Arola
Attorney, Agent, or Firm—Brooks & Kushman

[57] ABSTRACT

A tube coupling comprising a metal tube of relatively uniform thickness and having a radially outwardly expanded integral sleeve at one end thereof, and a radially extending tube shoulder being defined at the juncture at which the sleeve is expanded outwardly, the tube having a throughbore of a first inner diameter, and the expanded sleeve having a throughbore of a second inner diameter greater than the first inner diameter and concentric therewith. A cylindrical, hollow insert is located concentric with the axis of the tube, the insert including a radially extending annular collar at one end thereof. The collar has a tube end face abutting the radial tube shoulder and inertially welded to the tube at the interface of the tube end face and the radial tube shoulder. The insert includes at its other end a cylindrical barrel portion having hose locking and sealing means. A flexible hose is supported on the insert barrel portion and secured and sealed relative to the sleeve and the insert by the sleeve being crimped over the insert barrel portion to thereby extrude the hose into the sealing and locking grooves permanently holding the hose in compression.

10 Claims, 2 Drawing Sheets

TUBE-TO-HOSE COUPLING (SPIN-SERT) AND METHOD OF MAKING SAME

TECHNICAL FIELD

This invention relates to crimp-type tube-to-hose couplings and methods of making this type of coupling, with particular adaptation for vehicular air conditioning systems and similar sealed fluid conducting systems.

BACKGROUND ART

In every vehicular air conditioning system there is a plurality of sections of flexible hosing. These hose sections connect together, in a single system, the various system components including a compressor, condenser, etc. A coupling member is required at each hose end to allow the hose to be secured to the various components between which it extends. The coupling member will usually include one portion of a threaded fastener such as a captured, rotatable nut, or similar means of connection to a system component. The usual manner of securing the flexible hose to the coupling member is to utilize a coupling member having two concentric cylindrical portions spaced from one another by about the approximate thickness of the hose. One of these concentric members includes a radial extending flange securing it to the other member. The inner concentric member includes a throughbore having a diameter approximately equal to the inside diameter of the hose to which it is being coupled. During assembly, the hose is slipped over the inner concentric cylinder and the outer concentric cylinder is then crimped down upon the hose and the other member to form a fluid-type joint.

A typical coupling of this type is shown in U.S. Pat. No. 5,044,671, which is assigned to the assignee of the present invention. As will be noted from the '671 patent, the outer concentric member or sleeve of the coupling is in the shape of a cup such that it includes a radial flange extending radially inward toward the inner concentric tube. The flange includes a throughbore. To assemble the sleeve, the inner concentric member or tube is provided with annular locking ribs and the radial flange is then swaged onto the locking ribs of the tube. Alternatively, the inner tube may be upset, or otherwise provided with a radial shoulder, immediately adjacent and contiguous with both sides of the radial flange of the sleeve so as to provide an axial stop in both directions. In each case, the axial position of the two coupling components, i.e., the sleeve and the tube, is fixed relative to one another. It is not a fluid-tight seal and need not be since the sealing is done between the hose and the coupling member in the areas of the above-described crimp. It does require a number of metal forming operations on the same tube member, which in turn burdens product reliability concerns as well as adding to product cost.

Current technology for fabricating such a coupling includes the steps of (i) end forming the inner tube, (ii) shaving the tube with grooves forming the annular locking ribs to bite into the inside of the hose, (iii) attaching the crimp shell and locking it to the tube with a bead lock which is then formed on the tube, (iv) placing a metal insert inside the tube to keep the tube from collapsing when the hose is crimped or, alternatively, to place a temporary mandrel inside the tube during the crimping operation, and (v) crimping the shell and tube assembly onto the hose.

The process as described requires the purchase or fabrication of expensive metal inserts and crimp sleeves. If inserts are not used, then mandrel tooling must be fabricated depending on the hose configuration, thus requiring added expense. Further, the manner in which the sleeves are locked to the tube requires extensive end forming. The grooves and high surface finish needed on the tubes requires expensive shaving equipment and is a continual high cost maintenance item. Further, the sleeves lock to the tube in this manner providing no positive assurance that the hose and sleeve may not be rotated relative to the tube.

The present invention is directed toward eliminating the need for anything more than a single upsetting operation coupled with the conventional crimping step thereby improving product reliability and reducing product cost.

SUMMARY OF THE INVENTION

The present invention contemplates the use of a low cost screw machine insert inertially welded to the tube which is end formed in the form of an enlarged crimp shell or sleeve, with the flexible hose being thereafter inserted onto the insert between the insert and the sleeve and then crimped by the sleeve into a locked sealing engagement with the insert. The insert is made from a strong aluminum alloy which is extruded having a cylindrical outer diameter and a hexagonal concentric throughbore, thereby providing the means for rotatably driving the insert with a mandrel to inertially weld, i.e. spin weld, the insert to the tube. The result of the spin weld is a metallurgical joint axially and rotationally fixing the insert to the tube.

In comparing the advantages of the tube coupling in accordance with the present invention to that of the conventional practice as described above, the following advantages can be noted:

1. Superior tensile strength;
2. Metallurgical/hermetic joint between the insert and tube;
3. No metal inserts or mandrels required to avoid tube collapse during the hose crimping operation;
4. No expensive shaving and surface finish equipment is required;
5. No separately fabricated crimping shells or sleeves are required;
6. A superior surface finish on the outer circumference of the insert resulting from the insert being produced on a screw machine;
7. A simple end forming operation being required to produce the integral tube and crimping sleeve combination; and
8. In general, the resulting tube coupling requires less manufacturing steps and results in a superior joint at less cost over current technology.

The invention further contemplates a tube coupling comprising a metal tube having an expanded radially outwardly flared integral sleeve at one end thereof, and a radially extending tube shoulder being defined at the juncture at which the sleeve is flared outwardly, the tube having a throughbore of a first inner diameter, and the expanded sleeve having a throughbore of a second inner diameter greater than the first inner diameter and concentric therewith. A cylindrical, hollow insert concentric with the tube axis at one end is inertially welded to the tube at the radial shoulder. The insert includes at its other end a cylindrical barrel portion having hose locking and sealing means, and a flexible hose being received over the insert barrel portion in sliding engagement with the insert barrel portion and the sleeve, and being secured and sealed relative to the sleeve and the insert by the sleeve being crimped over the insert barrel portion to thereby extrude the hose into the sealing and locking grooves permanently holding the hose in compression.

The present invention also contemplates a method of producing the above-described tube coupling by the steps of (a) locating said tube within a chuck member having a throughbore opening into a radially enlarged generally concave seat portion at one end thereof, the chuck seat portion closely conforming in radial dimension to the radially extending tube shoulder and providing a stop for the radial tube shoulder (b) locating the insert on a rotatable mandrel, (c) rotating the mandrel under power, (d) inserting said insert and mandrel into said sleeve until said insert collar is brought into contact with said radial tube shoulder, and (e) thereafter terminating the rotational power to the mandrel and allowing the mandrel and insert to free-spin while holding the radial tube shoulder in compression between the die seat portion and the insert collar and thereby inertially welding the sleeve to the insert.

BEST MODE FOR CARRYING OUT THE INVENTION

Figure 1:
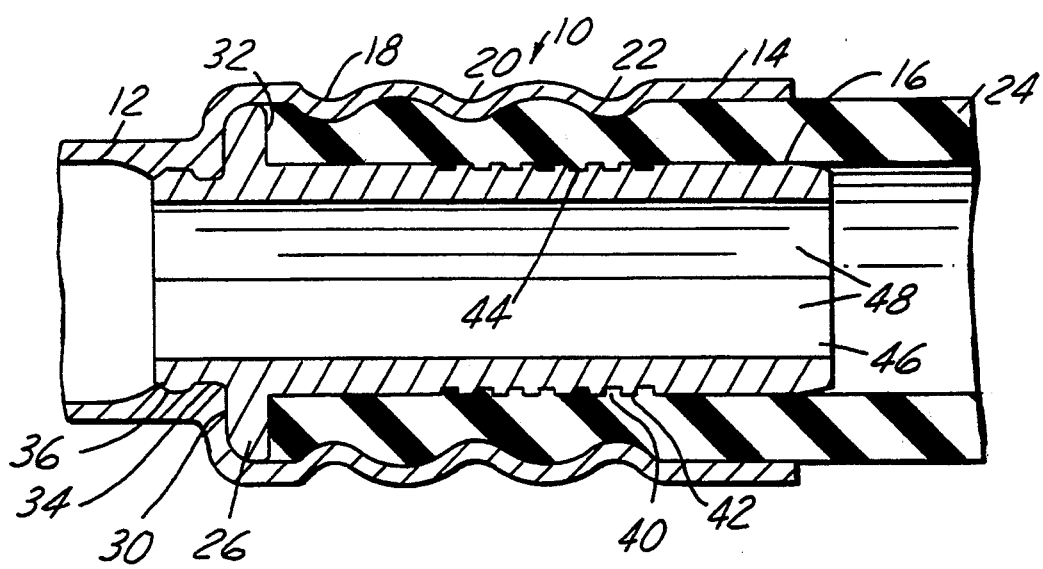
FIG. 1 is a cross-sectional view of the hose coupling of the present invention in its final assembled state showing the insert welded to the tube and the tube sleeve crimped on the hose and holding the hose onto the insert.
Figure 2:
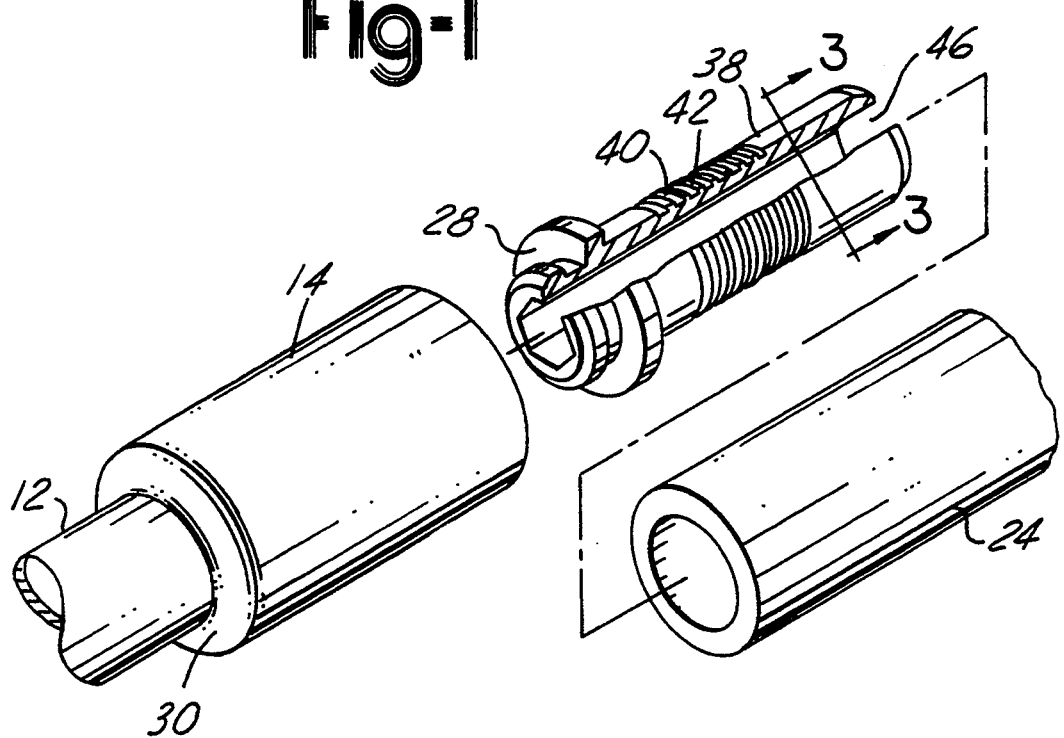
FIG. 2 is an exploded view of the tube coupling in accordance with the present invention and prior to the step of welding the insert to the tube.
Figure 3:
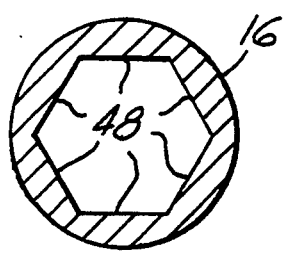
FIG. 3 is a cross-sectional view of the insert viewed in the direction of line 3—3 of FIG. 2.

Referring new to FIGS. 1 through 3, there is illustrated a hose coupling generally designated 10. The hose coupling 10, when assembled as described in greater detail below, forms a leak-proof joint having many fluid conveying applications, though particularly suited for use in a vehicular air conditioning system. The hose coupling 10 includes an aluminum alloyed tube 12 having a radially enlarged sleeve 14 at one end. A suitable alloy for tube 12 is 3000 series aluminum. The same or higher, i.e. 5000 or 6000 series aluminum is preferred for the sleeve 14. An insert 16 of high strength aluminum alloy such as 6061T6 series aluminum concentric with the tube 12 is welded at one end to the tube by means described below. A series of crimps 18,20,22 hold a flexible hose 24 axially affixed and sealed relative to the sleeve and insert. At the other end of tube 12 may be provided a flanged nut (not shown) retained on the tube by an upset tube end flange (not shown) to allow connecting the hose and coupling t an air conditioning system component, e.g. a compressor.

Figure 4:
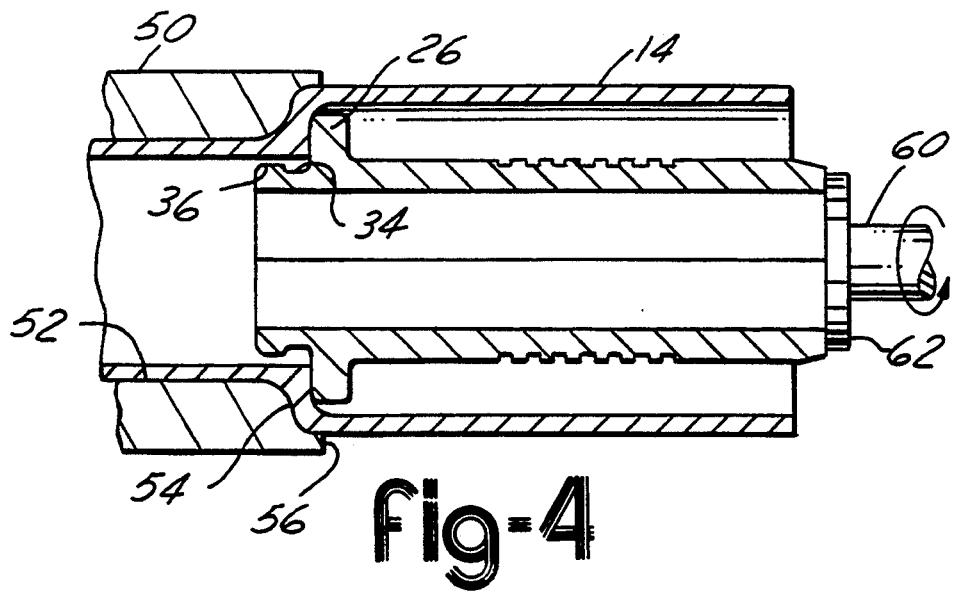
FIG. 4 is a cross-sectional elevation view of the tube coupling of the present invention showing the relative positioning of the insert within the tube just prior to the inertial welding step, and illustrating the die member within which the tube is held and the mandrel inserted within the insert for spin welding the insert onto the tube.

More specifically, as shown in FIG. 2 and 4, the tube 12 is seen to be an integral one piece tubular construction having a radially enlarged sleeve 14 at one end as can be formed by a conventional metal forming technique such as upsetting. A preferred method is to upset the end of the tube within a fixed die using an enlarged mandrel to radially expand the tube walls to the shape as shown in FIG. 2, and at the same time to form a radial stop shoulder 30 at the juncture of the tube and expanded sleeve. In FIG. 4, particularly, it will be noted that the radial shoulder 30 lies generally within a plane transverse to the axis of the coupling.

The insert 16 is seen to include a radially extending collar 26. The collar includes a tube end face 28 and a hose end face 32, each disposed in a plane generally transverse to the tube and collar axes. Intermediately adjacent the tube end face is a tube flash pocket 34 in the form of an annular groove and with the innermost radial portion of the tube end face forming a side wall of the flash pocket. An insert end rib 36 forms the opposing side wall of the flash pocket 34. As noted below, flash pocket 34 may also serve as a locking groove.

The remainder of the insert 16 comprises a barrel portion 38 which is cylindrical and extends axially to a point where in its assembled condition it extends slightly beyond the end of the sleeve 14 to thereby act as a pilot for locating the hose in accordance with one method cf assembly. Centered between the collar hose end face 32 and the end of the insert 16 is provided a series of locking ribs 40 and grooves 42. The ribs are equally spaced and of uniform axial length. Likewise, the grooves 42 are equally spaced and of uniform axial length with the length of the ribs and grooves being approximately equal. In a preferred form, locking ribs and grooves 40,42 are machined from the insert and include a bottom wall 44 parallel with the insert axis and side walls lying transversely to the insert axis.

An important feature of the invention is that the insert be strong enough to accept the radial clamp forces on it during the crimping operation. In part, this criteria is met by materials selection, i.e high strength aluminum. It is also met by maintaining wall thickness, e.g. for a 1 inch nominal size hose, the insert 16 wall thickness is 0.076–0.082 inches and the groove 42 depth is 0.008–0.015 inches.

Further, it will be noted from FIGS. 2 and 3 particularly, that the insert throughbore 46 is hexagonal in shape thereby providing longitudinal flats 48 about the inner circumference.

Figure 5:
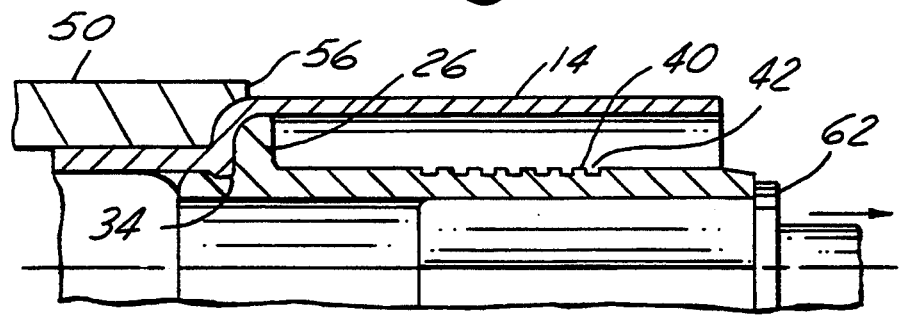
FIG. 5 shows the tube and insert in accordance with the present invention after having been spin welded to one another and while the tube coupling is still within the fixed die member and prior to retracting the mandrel from the insert.

The manner of assembling the insert to the sleeve is shown principally in FIGS. 4 and 5. The tube is first located within chuck collet members 50 having a radially adjustable longitudinally directed griping surface 52 of an inner diameter sized to grip and hold the tube in fixed engagement. The chuck collets each include a radially enlarged, generally concave seat portion 54 having a major diameter at the end 56 of the die member equal to or slightly larger than the outer diameter of the sleeve 14. It will be noted that the adjacent face of the radial shoulder 30 conforms with the conical seat portion, i.e. the seat portion 54 includes a radius which is equal that of the corresponding radius at the juncture of the tube with the radial shoulder of the sleeve portion 14. Conical seat portion 54 is coated with carboloy, or its equivalent, to enhance the anti-slip properties of the collet and thereby keep the sleeve 14 from slipping relative to the chuck during the spin weld operation.

The insert 16 is mounted on a mandrel 60 having a hexagonal cross-section only slightly less than that of the insert throughbore 46 and including a stop shoulder 62 abutting against the end of the insert. The insert and mandrel are then brought up to a desired speed and inserted into the sleeve until insert collar 26 abuts fixed sleeve radial shoulder 30. The mandrel is then held at this axial position and the rotational energy source is terminated. The sustained speed of the mandrel flywheel (not shown) is sufficient to cause the frictional welding between the collar 26 and radial shoulder 30. Since tube 12 is softer than insert 16, it will melt or soften at these interfaces and cause the metal to flow within the flash pocket 34, at least partially filling the flash pocket and any radial clearance between the tube and the insert end rib 36. Preferably, the collar of the insert will also be melted at the tube end face 28 so as to assume the configuration shown in FIG. 5. Thus, there will be metal flow and a metallurgical bond formed by the spin welding operation throughout the entire end of the insert from the radially outwardmost portion of the collar 26, along the tube end face 28, throughout the locking groove 34 and throughout the flash pocket or axial length of the insert end rib 36. As the weld sets, the mandrel will be brought to a stop.

Thereafter, the now integral tube and insert assembly is withdrawn from the chuck and mandrel and the hose 24 may be inserted within the cavity between the barrel portion of the insert and sleeve into abutting position with the hose end face 32 of the collar 26. Then the sleeve may be crimped in the manner as shown in FIG. 1 to extrude the hose into the locking and sealing grooves 40,42 along the barrel portion 38 of the insert to complete the hose coupling assembly.

While the best mode for carrying out the invention has been described in detail, those familiar with the art to which this invention relates will recognize various alternative designs and embodiments for practicing the invention as defined by the following claims.

What is claimed:

1. A tube coupling comprising a metal tube of relatively uniform thickness and having a radially outwardly expanded integral sleeve at one end thereof, and a radially extending tube shoulder being defined at the juncture at which said sleeve is expanded outwardly, said tube having a throughbore of a first inner diameter, and said expanded sleeve having a throughbore of a second inner diameter greater than said first inner diameter and concentric therewith;
   a cylindrical, hollow insert concentric with the axis of said tube, said insert including a radially extending annular collar at one end thereof, said collar having a tube end face abutting said radial tube shoulder and being inertially welded to said tube at the interface of said tube end face and said radial tube shoulder;
   said insert including at its other end a cylindrical barrel portion having hose locking and sealing means;
   a flexible hose supported on said insert barrel portion and being secured and sealed relative to said sleeve and said insert by said sleeve being crimped over said insert barrel portion to thereby extrude the hose into the sealing and locking grooves permanently holding said hose in compression.

2. A tube coupling as defined in claim 1 wherein said insert further including an annular tube groove immediately adjacent and contiguous with said tube end face, and said radial tube shoulder being extruded within and at least partially filling said tube groove.

3. A tube coupling as defined in claim 2 wherein said barrel portion includes a series of equally spaced locking and sealing grooves of substantially uniform depth and width and providing a series of equally spaced hose locking and sealing ribs of substantially uniform width between each pair of said grooves.

4. A tube coupling as defined in claim 3 wherein said insert, including said locking and sealing grooves, are screw machined thereby providing an enhanced surface finish.

5. A tube coupling as defined in claim 4 wherein said insert includes a throughbore of non-cylindrical cross-section to thereby provide means for imparting rotational torque to the insert and maintaining the cross-sectional area of the insert throughbore as it is being inertially welded to said tube.

6. A tube coupling as defined in claim 5 wherein the insert throughbore is hexagonal in cross-section thereby providing a cross-sectional area equivalent to that of a cylindrical throughbore and thus maintaining the fluid flow rate of the coupling without significantly reducing the hoop strength of the insert.

7. A tube coupling as defined in claim 1 wherein said insert includes a throughbore of non-cylindrical cross-section to thereby provide means for imparting rotational torque to the insert and maintaining the cross-sectional area of the insert throughbore as it is being inertially welded to said tube.

8. A tube coupling as defined in claim 7 wherein the insert throughbore is hexagonal in cross-section thereby providing a cross-sectional area equivalent to that of a cylindrical throughbore and thus maintaining the fluid flow rate of the coupling without significantly reducing the hoop strength of the insert.

9. A method of making a tube coupling, the tube coupling comprising a metal tube having an expanded radially outwardly flared integral sleeve at one end thereof, and a radially extending tube shoulder being defined a the juncture at which said sleeve is flared outwardly, said tube having a throughbore of a first inner diameter, and said expanded sleeve having a throughbore of a second inner diameter greater than said first inner diameter and concentric therewith;
   a cylindrical, hollow inert concentric with the axis of said tube and at one end being inertially welded to said tube at said radial tube shoulder;
   said insert including at its other end a cylindrical barrel portion having hose locking and sealing means;
   a flexible hose being supported on said insert barrel portion and being secured and sealed relative to said sleeve and said insert by said sleeve being crimped over said insert barrel portion to thereby extrude the hose into the sealing and locking grooves permanently holding said hose in compression;
   said insert including a radially extending annular collar at one end thereof, said collar having a tube end face abutting said radial tube shoulder and being inertially welded thereto, said insert further including a tube groove immediately adjacent said tube end face and said radial tube shoulder being extruded within and at least partially filling said groove during the inertial welding step;

said method comprising the steps of:

(a) locating said tube within a chuck member having a throughbore opening into a radially enlarged generally concave seat portion at one end thereof, the chuck seat portion closely conforming in radial dimension to said radially extending tube shoulder and providing a stop for the radial tube shoulder, (b) locating the insert on a rotatable mandrel, (c) rotating said mandrel under power, (d) inserting said insert and mandrel into said sleeve until said insert collar is brought into contact with said radial tube shoulder, and (e) thereafter terminating the rotational power to said mandrel and allowing the mandrel and insert to free-spin while holding the radial tube shoulder in compression between the chuck seat portion and the insert collar and thereby inertially welding the sleeve to the insert.

10. A method of making a tube coupling as shown in claim 9, further including the steps of:

(f) inserting a flexible hose over said insert, and (g) crimping said sleeve in preselected locations throughout the length of said sleeve to thereby extrude the hose end into the locking and sealing grooves along the barrel portion of said insert.

* * * * *